United States Patent [19]

Leinenger

[11] 4,418,813

[45] Dec. 6, 1983

[54] MODULAR OPEN CHUTING

[75] Inventor: John T. Leinenger, Pontiac, Mich.

[73] Assignee: Modular Automation, Inc., Clarkston, Mich.

[21] Appl. No.: 312,541

[22] Filed: Oct. 19, 1981

Related U.S. Application Data

[63] Continuation-in-part of Ser. No. 265,664, May 20, 1981, Pat. No. 4,381,834.

[51] Int. Cl.³ .............................................. B65G 13/11
[52] U.S. Cl. .................................. 193/35 J; 193/2 R; 193/35 R; 193/38
[58] Field of Search .................. 193/2 R, 2 A, 25 CT, 193/35 R, 35 J, 35 C, 37, 38, 41; 198/836, 860, 861; 211/189; 312/257 A, 257 R, 263, 264

[56] References Cited

U.S. PATENT DOCUMENTS

| 424,271 | 3/1880 | Chapman . | |
|---|---|---|---|
| 790,776 | 5/1905 | Alvey . | |
| 971,087 | 9/1910 | Smith . | |
| 1,013,292 | 1/1912 | Goehr . | |
| 1,252,616 | 1/1918 | Reif . | |
| 1,256,724 | 2/1918 | Pardee . | |
| 1,720,843 | 7/1929 | Lee . | |
| 1,802,089 | 12/1926 | Pfeiffer . | |
| 2,218,444 | 10/1940 | Vineyard . | |
| 2,284,488 | 8/1940 | Johnson . | |
| 2,947,401 | 8/1960 | Schuricht et al. | 193/25 FT |
| 3,134,472 | 5/1964 | Schuricht | 193/25 FT |
| 3,343,793 | 11/1964 | Waser . | |
| 3,491,873 | 1/1970 | Fauth | 198/836 |
| 3,739,904 | 6/1973 | Windstrup | 198/860 |
| 3,837,452 | 9/1974 | Schuricht . | |
| 4,056,180 | 11/1977 | Gunti | 193/35 J |
| 4,198,043 | 4/1980 | Timbes et al. . | |

Primary Examiner—Jeffrey V. Nase
Attorney, Agent, or Firm—Basile, Weintraub & Hanlon

[57] ABSTRACT

A modular chute for passing a workpiece therealong is disclosed. The chute of the present invention includes a pair of side walls secured in a spaced apart manner by a plurality of clips attached to upper and lower edges of the side walls. Wear members are disclosed that are selectively secured to the walls of the chute or to the clips to reduce friction and wear from parts moving along the chute.

9 Claims, 22 Drawing Figures

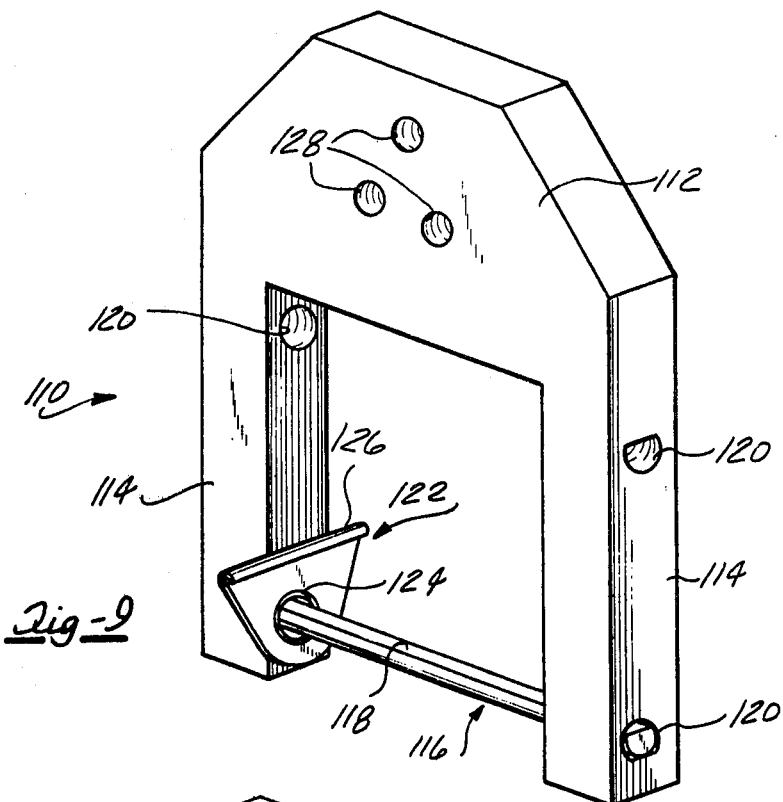
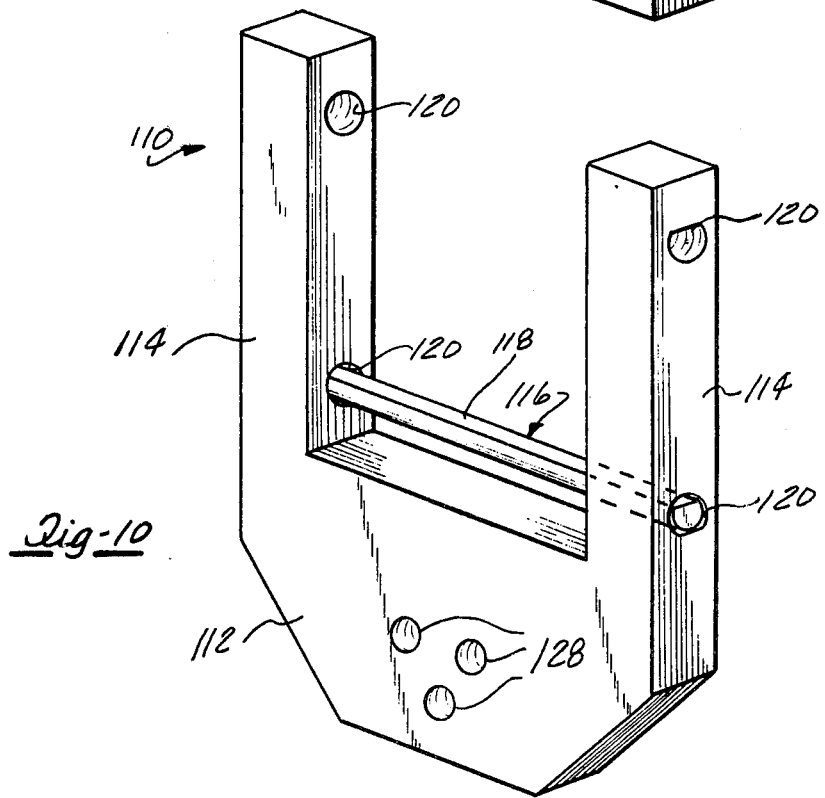

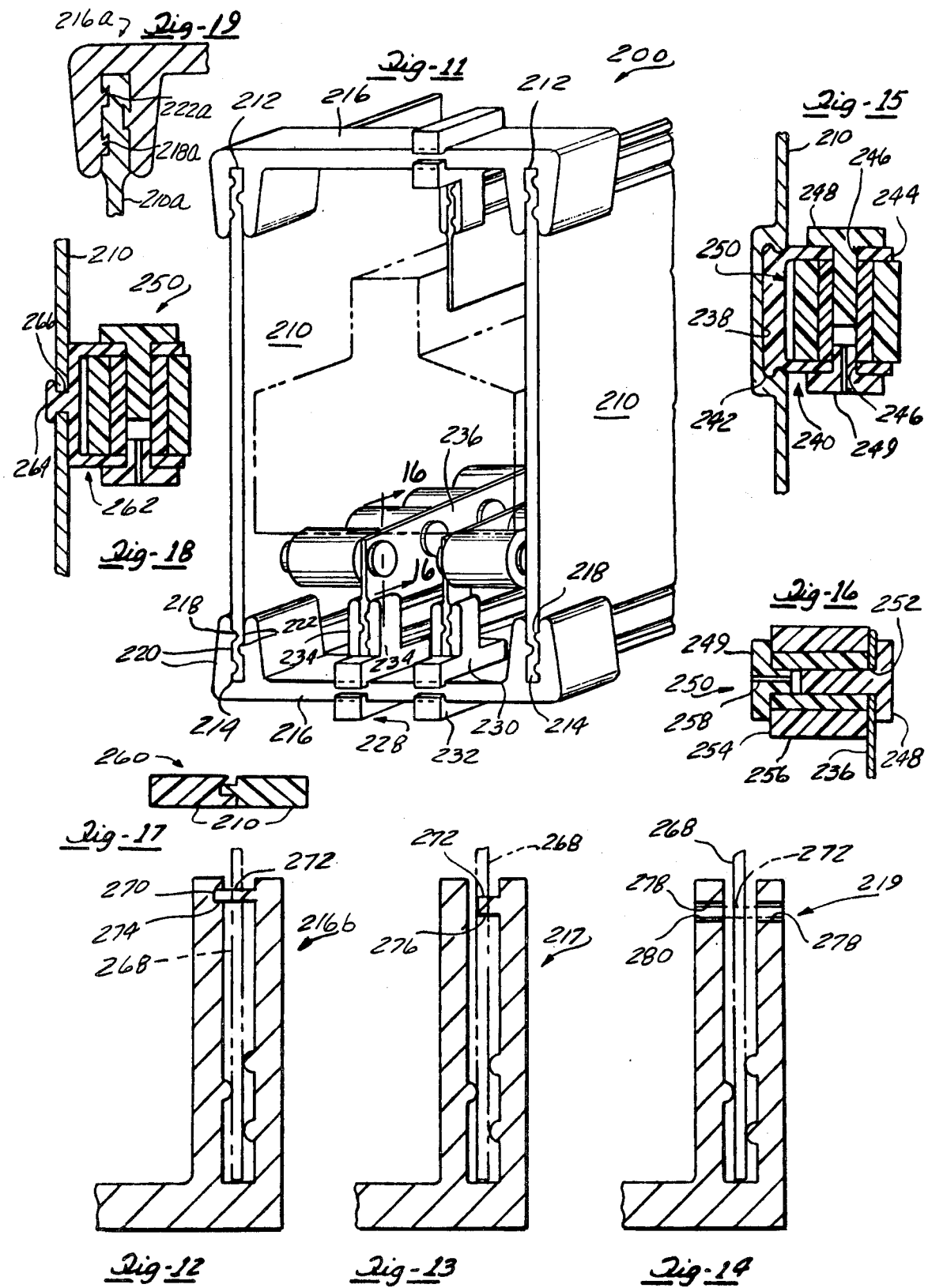

MODULAR OPEN CHUTING

This application is a continuation-in-part of copending application Ser. No. 265,664 filed May 20, 1981, now U.S. Pat. No. 4,381,834 entitled "Modular Chuting," the disclosure of which is incorporated by reference.

BACKGROUND OF THE INVENTION

1. Field of the Invention

The present invention generally relates to material handling devices and, in particular, the present invention is concerned with modular chuting for moving workpieces from one piece to another under gravity and along the chute.

Description of the Prior Art

Chutes, both linear and curved, for conveying parts from one location to another are well known in the art. A variety of methods have been proposed for joining and supporting chutes as well as for providing chutes with projections along their inside walls to aid in part conveyance. Examples of chutes and chute systems in the prior art are disclosed in U.S. Pat. Nos. 1,252,616; 971,087; 2,218,444; 2,284,488; and 4,198,043. Examples of chutes and chuting systems having a non-linear form are disclosed in U.S. Pat. Nos. 424,271; 790,776; 1,013,292; 1,256,724; 1,720,843; 1,802,089; 3,343,793; and 3,837,452. These patents are relevant to the Applicant's invention in that they represent the closest prior art for utilizing chutes to convey parts from one location to another under gravity. They do not, however, disclose or anticipate the device of the present invention of a pair of spaced sidewalls secured in a spaced manner by a plurality of transverse clips. None of the above-listed United States Patents disclose nor anticipate the use of grooves or recesses formed along the sidewalls of the chute and support clips attached to the transverse clips to receive wear-resistant inserts to aid in the movement of workpieces along the chute as disclosed in the present invention.

PRIOR ART STATEMENT

The aforementioned prior art, in the opinion of the Applicant and the Applicant's attorneys, represents the closest prior art of which the Applicant and his attorneys are aware.

SUMMARY OF THE INVENTION

The present invention, which will be described in greater detail hereinafter, comprises a modular chute for passing a workpiece therealong which includes a plurality of lengths of chute having spaced apart sidewalls held in a spaced relationship by a plurality of tranverse clips attached to the upper and lower edges of the sidewalls. Grooves or recesses formed along sidewalls of the chute are utilized to selectively attach a variety of wear-resistant members to the walls of the chute to minimize wear and to assist in the movement of the workpieces along the chute.

The chute of the present invention includes a plurality of support clips attached to the transverse clips which support a wear-resistant support piece deployed longitudinally along the bottom of the chute to support the workpiece. In the preferred embodiment an adhesive is used to bond the sidewall ends, one to the other.

It is therefore a primary object of the present invention to provide a new and improved modular chute system.

It is a further object of the present invention to provide a modular chute system which may be readily joined into a continuous piece.

It is yet another object of the present invention to provide grooves and recesses along the inside walls of the chute to selectively attach wear-resistant members which aid in the movement of workpieces along the chute.

It is another object of the present invention to provide anti-friction bearings and bearing supports that may be selectively attached to the walls of the chute to reduce wear and friction.

It is yet another object of the present invention to provide an improved chute system which may be readily and inexpensively installed.

Further objects, advantages and applications of the present invention will become apparent to those skilled in the art of conveyors and chute systems when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the various views, and wherein:

FIG. 3 illustrates a partial cross-sectional view of a wear-reducing element engageable with a dovetail joint of FIG. 2;

FIG. 4 illustrates an alternate embodiment of a wear-reducing element engageable with the dovetail groove of FIG. 2;

FIG. 9 illustrates a perspective view of a support bracket for supporting the chute from overhead;

FIG. 10 illustrates a perspective view of the support bracket of FIG. 9 deployed to support the chute from the ground;

FIG. 11 illustrates a broken perspective view of the open chuting system of the present invention;

FIG. 12 illustrates a cross-sectional view through the clips, the clip having a projection which engages an aperture in the sidewall and an aperture in an opposite leg of the clip;

FIG. 13 illustrates a cross-sectional view through the clip wherein the clip includes a projection for engaging an aperture formed in the sidewall of the chute;

FIG. 14 illustrates a cross-sectional view through the clip wherein the clip includes a pair of aligned apertures in the clip legs with a pin snugly engaging the apertures and an aligned aperture in the sidewall;

FIG. 15 illustrates a cross-sectional view through the sidewall illustrating a dove-tail mounting for an anti-friction bearing;

FIG. 16 illustrates a cross-sectional view taken through a support bearing taken along the line 16—16 in FIG. 11;

FIG. 17 illustrates a cross-sectional view through the sidewall showing a tongue and groove joint for joining lengths of sidewall;

FIG. 18 illustrates a cross-sectional view through an anti-friction bearing with the bearing mounted to the sidewall by a heated projection penetrating an opening formed in the sidewall;

FIG. 19 illustrates a cross-sectional view through the clip and a portion of the sidewall showing an interlocking joint between the sidewall and the clip;

DESCRIPTION OF THE PREFERRED EMBODIMENT

Figure 1:
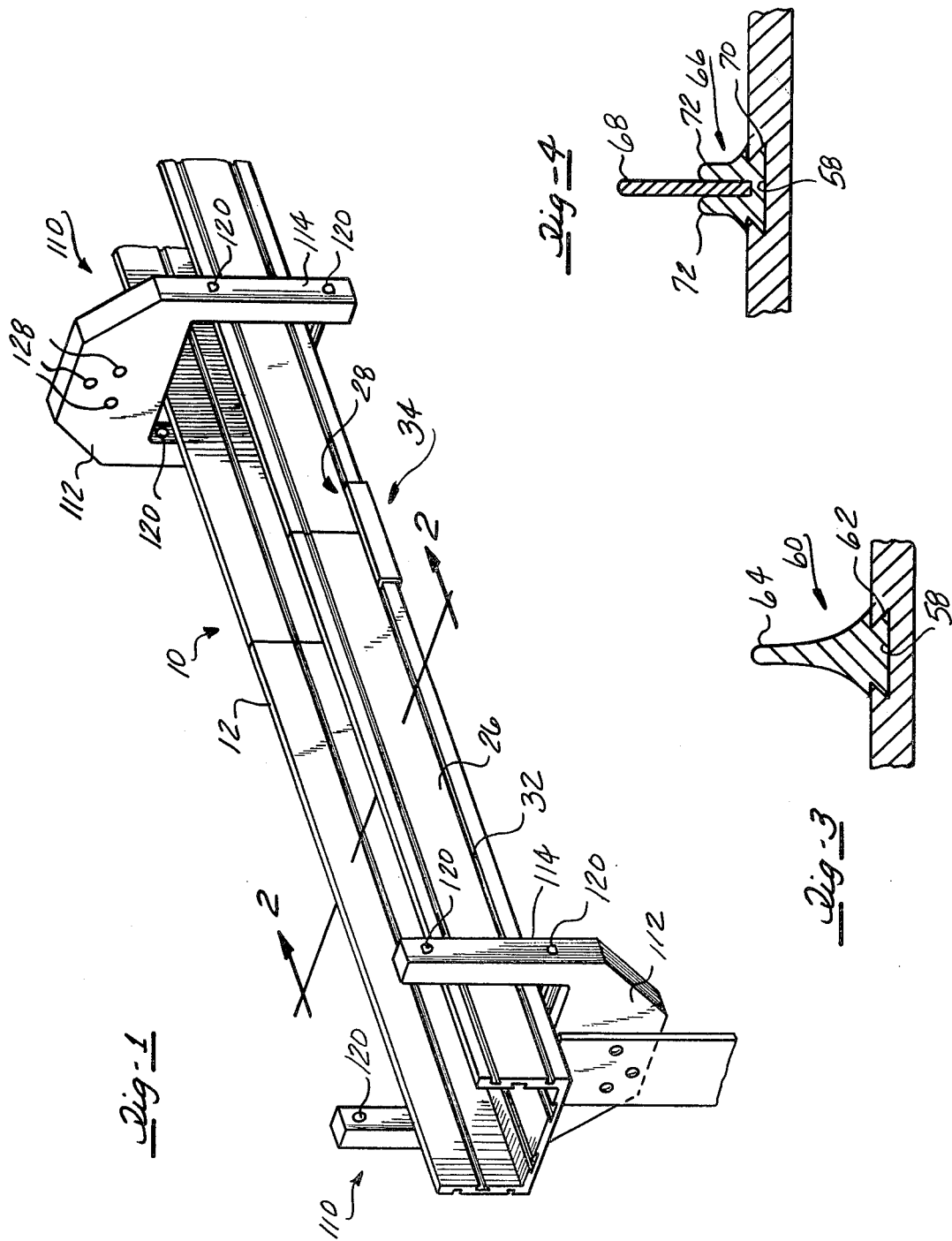
FIG. 1 illustrates a broken, perspective view of the chuting system of the present invention.

Referring now to FIG. 11 of the drawing, there is illustrated an example of the preferred embodiment of the present invention in the form of an open chute assembly 200 adapted to pass a workpiece there along under gravity. The open chute assembly 200 comprises a pair of spaced apart sidewalls 210 having an upper edge 212 and a lower edge 214. A plurality of clips 216 are deployed along the upper and lower edges to position and retain the sidewalls in a spaced apart position. A plurality of grooves 218 are formed along the sidewalls 210. Each clip 216 includes a pair of spaced legs 220 extending over the grooves 218. The legs 220 include projections 222 aligned with and complimentary to the grooves 218 to secure the clips 216 to the sidewall.

Figure 21:
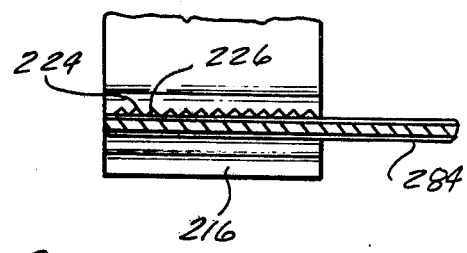
FIG. 21 illustrates a cross-sectional view through the sidewall of FIG. 20 taken along the line 21—21 of FIG. 20.

As shown in FIG. 21 of the drawing, the preferred embodiment further includes a plurality of vertical grooves 224 overlaying the grooves 218 and a plurality of vertical projections 226 on the clip 216 are aligned with and complimentary to the vertical grooves 224 to secure the clip 216 against longitudinal movement along the sidewall 210.

Referring again to FIG. 11 of the drawing, a support clip 228 engages the clip 216 and comprises a pair of spaced legs 230, 232 snugly engaging a transverse portion of the clip 216. A pair of outward extending legs 234 integral with one of the spaced legs 230 snugly supports a wear-resistant support piece 236 between legs. The support piece 236 extends longitudinally along the chute and provides a low friction and wear-resistant support for the workpiece as it passes along the chute.

As shown in FIG. 15 of the drawing, the sidewall 210 may include a dovetail groove 238 formed along the sidewall, with a bearing support 240 having a dovetail 242 snugly engageable with the dovetail groove 238. A pair of spaced apart arms 244 extend inward from the dovetail with a pair of vertically aligned apertures 246 formed in the arms. A pair of headed pins 248, 249 engage the vertically aligned apertures 246 to support an anti-friction bearing 250 and provide anti-friction transverse positioning for the workpiece.

FIG. 16 of the drawing illustrates a cross-sectional view of an anti-friction bearing mounted to the wear-resistant support piece 236. As shown in FIG. 16 a plurality of apertures 252 are formed along the support piece 236, and the support pin 248 snugly engages the apertures. An anti-friction sleeve 254 snugly engages the headed pin 248 and abuts the support piece 236 securing the pin 248 and the sleeve 254 to the support piece. A wear-resistant roller 256 slidingly engages the anti-friction sleeve 254 and the headed pin 249 is inserted into the sleeve 254 to hold the roller 256 in place. Adhesives may be used to secure the pins 248, 249 to the wear-resistant support piece 236 and the anti-friction sleeve 254, or a snug fit or press fit may be relied upon to hold the parts in place. An opening 258 is provided in the headed pin 249 to allow air to escape during assembly and to prevent air lock.

FIG. 17 of the drawing illustrates a cross-sectional view through a portion of the sidewall 210 wherein a pair of abutting sidewalls are adjoined by use of a tongue and groove joint 260. A suitable adhesive such as epoxy glue may be used to permanently fasten the abutting pieces 210.

FIG. 18 of the drawing illustrates an alternate bearing support 262 for mounting the bearing 250 to the sidewall 210 and comprises a headed projection 264 snugly engaging an aperture 266 formed in the sidewall 210.

As shown in FIG. 19 of the drawing, a clip 216(a) having interlocking projections 222 (a) may be used to secure the clip to a sidewall 210 (a). The sidewall includes corresponding recesses 218 (a) to engage the projections 222 (a) and secure the clip to the sidewall.

FIG. 12 of the drawing illustrates a means for securing a clip 216b; to a flat piece of sidewall 268 with the sidewall 268 not having projections to secure the clip to the sidewall. The clip 216b; includes a projecting pin 270 which engages an aperture 272 formed in the sidewall 268 and engaging a recess 274 formed in an opposite leg of the clip. The pin 270 secures the clip 216b; to the sidewall 268 and prevents movement of the clip 216b relative to the sidewall 268.

FIG. 13 of the drawing illustrates at 217 an alternate clip configuration for securing the clip 217 to a flat sidewall 268. A clip 217 comprises a projection 276 to engage the aperture 272 formed in the sidewall 268 and prevent relative movement of the clip 217 with respect to the wall 268.

FIG. 14 of the drawing illustrates a second alternative clip configuration 219 for securing the clip to the sidewall 268. This configuration comprises a pair of aligned apertures 278 formed in the legs of the clip aligned with the aperture 272 formed in the wall 268 and a pin 280 engaging the aperture 278 and 272 to secure the clip 219 to the sidewall 268.

Figure 20:
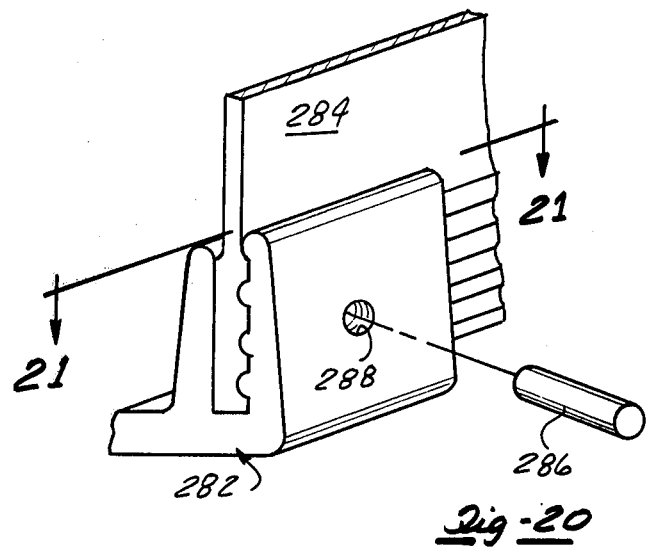
FIG. 20 illustrates a broken perspective view of an end of a clip and the sidewall.

FIG. 20 of the drawing illustrates a broken-perspective view of a clip 282 joined to a sidewall 284 with vertical grooves 224 (FIG. 21) snugly receiving vertical projections 226 to secure the clip 282 to the wall 284. An aperture 288 formed through the legs of the clip and the wall 284 receives a pin 286 to further aid in securing the clip 282 and the wall 284 into a permanent assembly.

Figure 22:
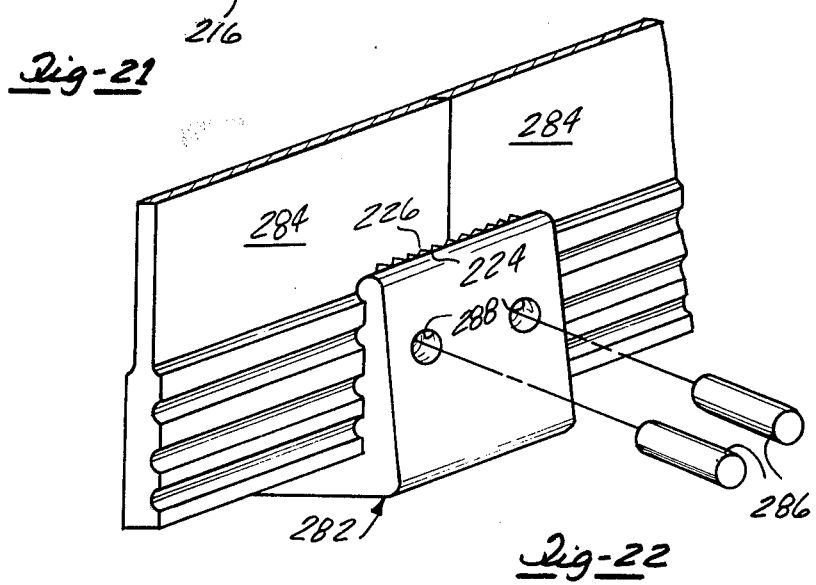
FIG. 22 illustrates a broken perspective view of a sidewall and clip with provision for abutting and securing a pair of joined sidewalls.

As shown in FIG. 22 of the drawing, the plurality of vertical grooves 224 and the plurality of vertical projection 226 formed in the legs of the clip 282 may be employed to secure a pair of sidewall 284 in abutment. A pair of transverse apertures 288 formed through the legs of the clip and the sidewall 284 accommodate a pair of pins 286 to secure the clip to the sidewalls 284 and assure a secure joint.

Figure 2:
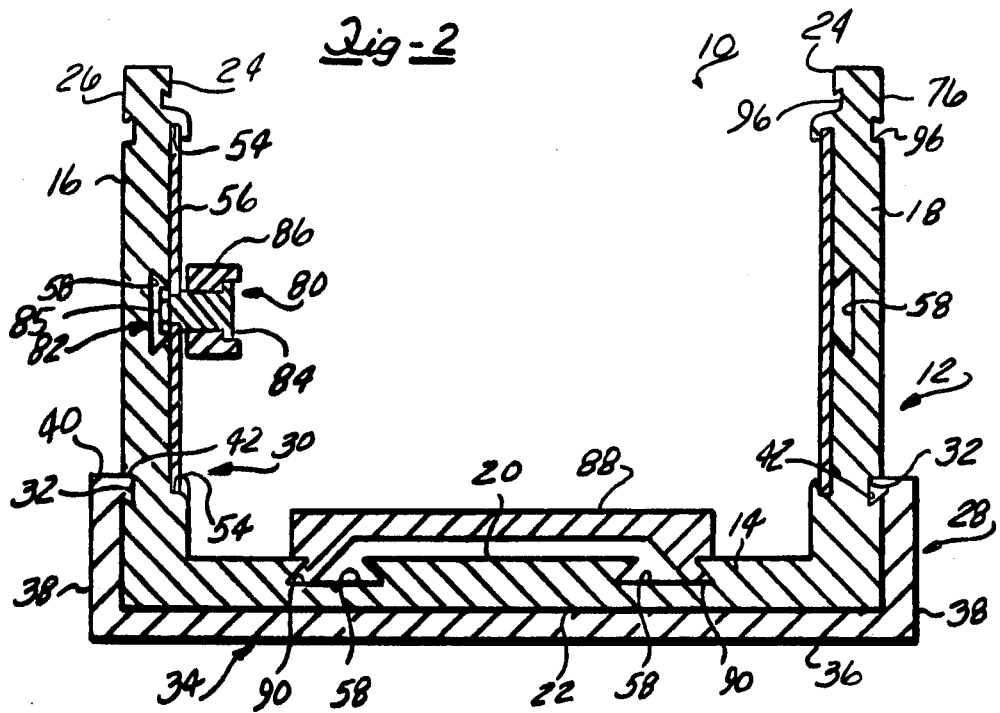
FIG. 2 illustrates a cross-sectional view of the chute taken along line 2—2 of FIG. 1.

Referring again to the drawing, there is illustrated in FIG. 1 another example of the present invention in the form of a chute assembly 10. As shown in FIG. 2, the chute assembly 10 includes a chute 12 having a U-shaped cross-section including a bottom wall 14, a pair of opposed sidewalls 16, 18 formed into a unitary structure. The bottom wall 14 includes an inside surface 20 and an outside surface 22, and each opposed sidewall 16, 18 includes an inside surface 24 and an opposed sidewall outside surface 26. A joining means 28 is provided for abutting and securing a plurality of chutes 12 into a continuous member. A means 30 is provided for securing a wear-resistant member to the walls of the chute. The means 28 and 30 will be discussed in greater detail hereinbelow.

Figure 5:
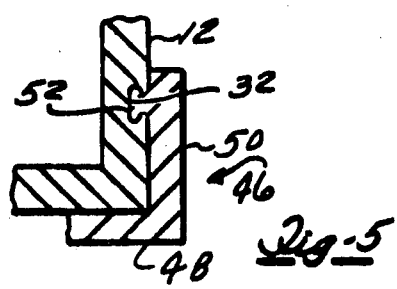
FIG. 5 illustrates an alternate embodiment of a jointing device for joining lengths of chute together.
Figure 6:
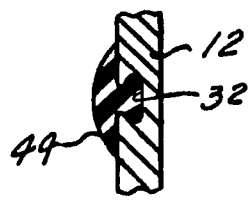
FIG. 6 illustrates a cross-section view of an additional embodiment of a method for joining lengths of chute together.

Referring now to FIGS. 1 and 2 of the drawing, the means 28 for joining lengths of chute 12 comprises a pair of opposed grooves 32 formed longitudinally along the outside wall surface 26, and a U-shaped coupling member 34 comprising a coupling bottom wall 36 and a pair of opposed upright walls 38 integral with the bottom wall 36 formed into an integral member. The upright walls 38 include an upper edge 40 along which is formed a bead 42 which is snugly engageable with the opposed grooves 32 to secure the coupling members 34 to the chute 12. In a preferred liquid carrying embodiment, a pair of chutes 12 with abutting ends are first covered along their abutting ends with adhesive and the coupling member 34 is applied abutting the outside surface 22, 26 with adhesive applied between the abutting surfaces. This forms a continuous member with smooth, continuous inside surfaces to allow smooth sliding of workpieces along the chute. As shown in FIG. 6 of the drawing, a joining bead 44 may be employed to snugly engage the groove 32 and hold lengths of chute in an aligned position. In utilizing the joining bead 44, the abutting ends are covered with adhesive and aligned and held in abutment until the adhesive sets to form a smooth, continuous joint. If good alignment and abutment is not possible between adjoining chutes 12, it is recommended that a coupling member 34 be employed to affect the joint rather than the use of the joining bead 44. In another embodiment illustrated in FIG. 5, an L-shaped joining bead 46 may be employed. The L-shaped joining bead 46 includes a bead bottom wall 48 and a bead vertical wall 50 abutting the outside surfaces of the chute 12. A projection 52 snugly engages the opposed groove 32 to hold the abutting pieces of conduit 12 in alignment. It is preferable to wet the abutting surfaces with adhesive prior to joining them together. The L-shaped joining bead is employed to hold the abutting lengths of conduit 17 in abutment and alignment until the adhesive forms a bond to produce a liquid-tight, smooth, permanent joint for moving workpieces therealong.

As is illustrated in FIG. 2 of the drawing, the means 30 for securing a wear-resistant member to the walls of the chute comprises a pair of spaced-apart, opposed recesses 54 formed longitudinally along an inside surface of the chute 12, and a wear-resistant member 56 such as a hardened steel plate or abrasion-resistant plastic piece snugly retained between the recesses 54.

As illustrated in FIGS. 2, 3 and 4 of the drawing, a second embodiment of the means 30 for securing a wear-resistant member to the walls of the chute comprises a plurality of dovetail grooves 58 formed longitudinally along the inside walls of the chute 12. The dovetail grooves 58 are configured to snugly retain a variety of wear-resistant members as shown in FIG. 3 and 4. The water-resistant member illustrated in FIG. 3 comprises an insert 60 having a first end 62 with a complementary form to snugly engage the dovetail groove 58 and an inward projecting second end 64 to abut and support the workpiece. The insert 60 may be made from wear-resistant steel or plastic, depending upon the workpiece to be supported. Also, anti-friction materials such as bonded graphite fibers, teflon or teflon-coated steel may be used.

FIG. 4 of the drawing illustrates a support 66 for a wear-resistant insert 68. The support 66 includes a lower end 70 snugly engageable with the dovetail 58 and a pair of upward extending legs 72 to snugly retain the wear-resistant insert 68.

Figure 7:
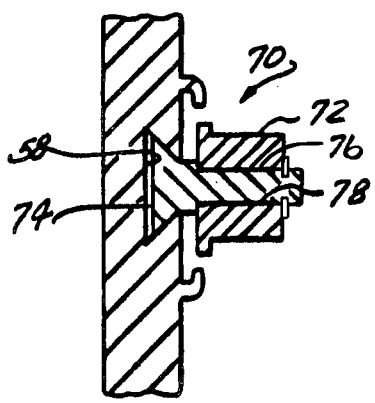
FIG. 7 illustrates a bearing support and an anti-friction bearing engageable with a dovetail groove.

Referring now to FIG. 7 of the drawing, there is illustrated a bearing support 70 for supporting a roller bearing 72. The bearing support 70 comprises a dovetail end 74 snugly engaging the dovetail groove 58 and an inward projecting rod end 76 to rotatingly support the roller bearing 72 along a bearing bore 78.

Referring again to FIG. 1 of the drawing, there is illustrated at 80 an additional means for securing a wear-resistant member to the walls of the chute comprising a plurality of spaced apertures 82 formed along the wear-resistant member 56, a rod 84 engaging each aperture 82, a thread formed on one end of the rod 84 with a nut 86 engaging the thread to secure the rod to the member 56. A bearing 86 is rotatingly supported by the rod 84 and provides a support for the workpiece.

Also shown in FIG. 1 of the drawing is a flat, wear-resistant plate 88 secured to the inside wall of the chute 12 by a pair of spaced dovetails 58. A pair of projections 90 formed along the flat plate 88 abut the dovetails 58 to secure the plate 88 to the wall of the chute 12.

Figure 8:
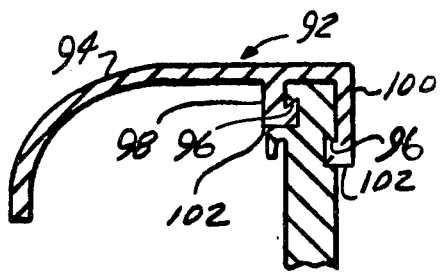
FIG. 8 illustrates a cross-sectional view of a part retainer engageable with an upper edge of the chute.

It is often desirable to partially cover the open top of the chute with a part retainer to prevent parts from falling out of the chute when a jam-up occurs. FIG. 8 of the drawing illustrates a part retainer 92 having a top wall 94 overlaying the open top. A pair of upper grooves 96 formed along the pair of opposed side walls 16, 18 proximate the open top are utilized to retain the part retainer 92 to the side walls. A pair of downward extending legs 98, 100 includes a hook-like projection 102 at a lower end thereof to snugly engage the upper grooves 96 and retain the part retainer 92 to the side wall.

As shown in FIGS. 1, 9 and 10 of the drawing, a support bracket 110 is provided which can support the chute 12 from either below the chute or above the chute. The bracket 110 comprises a transverse member 112 and a pair of projecting legs 114 spaced to straddle the trough 12 therebetween. A dowel 116 with a flat side 118 extends between legs 114 and is supported by apertures 120 formed in the projecting legs 114. The dowel 116 is allowed to rotate within the aperture 120 once it is in place so that the flat side of the dowel can abut the bottom wall outside surface 22. A pair of retaining clips 122 is slidably retained by the dowell 116. Each Each clip 122 includes an aperture 124 to slidingly engage the dowel 116 and an upper bead 126 to snugly engage the opposed grooves 32, securing the bracket 110 to the chute 12. As shown in FIG. 1 of the drawing, the brackets 110 can support the trough 12 from either above or below. A plurality of apertures are utilized to secure the bracket 110 to a suspension rod or a post providing the support for the bracket 110, which in turn supports the chute 12.

It can thus be seen that the present invention has provided a new and improved modular chute for passing a workpiece therealong. It is obvious to the skilled artisan that the chute can be made from a variety of materials including extruded aluminum, plastic, etc. It is contemplated that the chute can be made economically from PVC plastic, although the teachings of the invention are not limited to this material.

It is also obvious to the skilled artisan that, in the preferred embodiment, the chute may be assembled in a curved or surpentine manner with the clips maintaining the sidewalls in a properly spaced and vertical position for the movement of the workpiece under gravity.

It should be understood by those skilled in the art of modular chutes that other forms of the Applicant's invention may be had, all coming within the spirit of the invention and the scope of the appended claims.

Having thus described my invention, what I claim is:

1. A modular chute with open top and bottom for passing a work piece therealong comprising:
   a pair of spaced apart sidewalls having an upper edge and a lower edge;
   a plurality of clips deployed along said upper and lower edges to secure said sidewalls in the spaced apart position; and
   means for releasably securing a wear resistant workpiece support member to said clips;
   and wherein said clips include means for snappedly securing said clips to the sidewalls.

2. The modular chute of claim 1 further comprising:
   a plurality of grooves formed along said side walls; and
   said clips including spaced apart legs extending over said grooves, said legs having projections complimentary to said grooves, said projections releasably engageable with said grooves to secure said clips to said side wall.

3. The modular chute of claim 1 further comprising:
   said clip including a pair of spaced apart legs straddling said sidewall, an aperture formed in said sidewall, a raised portion formed on said leg snugly engageable with the aperture to secure said clip to said side wall.

4. The modular chute of claim 1 wherein the means for securing the workpiece support member to the clip comprises:
   a support clip;
   said support clip comprising a pair of spaced legs snugly engaging said clip, a pair of outward extending legs integral with one of said spaced legs; and
   means assocated with said outward extending legs for releasably attaching a wear-resistant workpiece support member.

5. The modular chute of claim 4 further comprising:
   a wear-resistant workpiece support snugly engageable between said outward extending legs.

6. The modular chute of claim 5 further comprising a plurality of apertures formed along said work piece support, and a plurality of anti-friction bearings snugly engaging said apertures to provide anti-friction support for the workpiece.

7. The modular chute of claim 1 further comprising:
   a dovetail groove formed longitudinally along said side wall; and
   a wear-resistant member engageable with said dovetail groove.

8. The modular chute of claim 7 wherein said wear resistant member comprises:
   a bearing support snugly engaging said dovetail groove;
   a pair of outward extending arms projecting inward from said dovetail groove;
   a pair of vertically aligned apertures formed in said arms;
   a pin extending between said vertically aligned apertures; and
   an anti-friction bearing supported by said pin whereby the bearing provides transverse positioning for the workpiece.

9. A modular chute with an open top and bottom for passing a workpiece therealong comprising:
   a pair of spaced apart side walls having an upper edge and a lower edge;
   a plurality of clips releasably snap attached along said upper and lower edges to position said side walls in the spaced apart position;
   a plurality of grooves formed along said side walls;
   each clip including a pair of spaced legs extending over said grooves, said legs including projections aligned with and complimentary to said grooves to secure said clips to said side wall;
   said side wall further including a plurality of vertical grooves overlaying said grooves, a plurality of vertical projections formed in said spaced legs aligned with and complimentary to said vertical grooves to secure said clip against longitudinal movement along said side wall;
   a support clip comprising a pair of spaced legs snugly engaging said clip, a pair of outward extending legs integral with one of said spaced legs;
   a wear-resistant support piece snugly supported between said outward extending legs, said wear-resistant support piece extending longitudinally along the chute to provide anti-friction support for the workpiece;
   a dovetail groove formed longitudinally along said side wall; and
   a bearing support having a dovetail snugly engageable with said dovetail groove, a pair of spaced apart arms extending inward from said dovetail, a pair of vertically aligned apertures formed in said arms, a pin extending between said vertically aligned apertures, and an anti-friction bearing supported by said pin whereby the bearing provides anti-friction transverse positioning for the workpiece.

* * * * *